United States Patent

[11] 3,628,681

[72] Inventor Solomon Schwartz
Pennsauken, N.J.
[21] Appl. No. 864,063
[22] Filed Oct. 6, 1969
[45] Patented Dec. 21, 1971
[73] Assignee Plastics Consulting and Manufacturing Co.
Camden,, N.J.

[54] STOPPER
4 Claims, 4 Drawing Figs.
[52] U.S. Cl................................................ 215/48,
215/7, 215/37 R
[51] Int. Cl...................................................... B65d 39/00
[50] Field of Search............................................ 215/7, 48,
37

[56] References Cited
UNITED STATES PATENTS

| | | | |
|---|---|---|---|
| 686,008 | 11/1901 | Trombert...................... | 215/48 UX |
| 1,652,156 | 12/1927 | Beauchamp................... | 215/48 |
| 2,194,233 | 3/1940 | Renka........................... | 215/48 |
| 3,364,890 | 1/1968 | Andersen...................... | 215/37 R UX |
| 3,463,339 | 8/1969 | McGuckin..................... | 215/38 |

Primary Examiner—Donald F. Norton
Attorney—Seidel, Gonda & Goldhammer

ABSTRACT: A rubber stopper is encapsulated within a coating of polymerized fluorocarbon resin to obtain the resilience of rubber and the chemical resistance of the fluorocarbon resins.

PATENTED DEC 21 1971 3,628,681

INVENTOR
SOLOMON SCHWARTZ
BY
Seidel, Gonda & Goldhammer
ATTORNEYS.

STOPPER

This application relates to a stopper. More particularly, this application relates to rubber stoppers encapsulated within a thin coating of polymerized fluorocarbon resin selected from the group consisting of polytetrafluoroethylene fluorinated ethylene propylene, and polyhexafluoropropylene.

The classic rubber stopper used to seal containers for reagents has been in use for many years. It is usually a frustoconical structure made of rubber for resilience and of varying size depending upon the container which it is to seal. The stopper may also be made of synthetic material such as neoprene, silicone rubber and butyl rubber. Polyethylene stoppers are also known. The problem encountered with the known stoppers is that the rubber compound decomposes with exposure to corrosive chemicals and other reagents. The simple substitution of a plastic stopper for the rubber stopper is no solution to the problem because plastics are not as resilient as rubber. Moreover, most plastics are no more resistant to the corrosive effects of chemicals.

The present invention overcomes the foregoing difficulties by providing a stopper that is encapsulated in a thin coating of a polymerized fluorocarbon resin. In this way, the stopper can be made of rubber and thus still retain the primary advantage of rubber which is its resiliency. At the same time, the rubber is protected by a coating of a polymerized fluorocarbon resin such as polytetrafluoroethylene (PTFE). PTFE is characterized by its extreme inertness to chemicals, very high thermal stability, low coefficient of friction, and ability to resist adhesion to almost any material. The later characteristic of the material adds another advantage to the invention in that the surface of the stopper is very easy to clean since practically nothing will stick to it.

Thus, in accordance with the present invention, a stopper, preferably made of natural rubber, is encapsulated in a thin coating of a polymerized fluorocarbon resin selected from the group consisting of polytetrafluoroethylene (PTFE), fluorinated ethylene propylene (FEP) or polyhexafluoropropylene.

For the purpose of illustrating the invention, there is shown in the drawings a form which is presently preferred; it being understood, however, that this invention is not limited to the precise arrangements and instrumentalities shown.

Referring now to the drawing in detail, wherein like numerals indicate like elements, there is shown in FIG. 1 a stopper constructed in accordance with the present invention and designated generally as 10.

Figure 1:
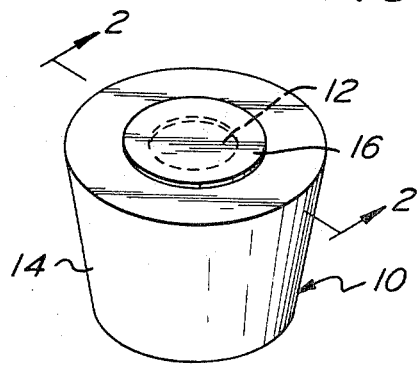
FIG. 1 is a perspective view of a stopper in accordance with the present invention.
Figure 2:
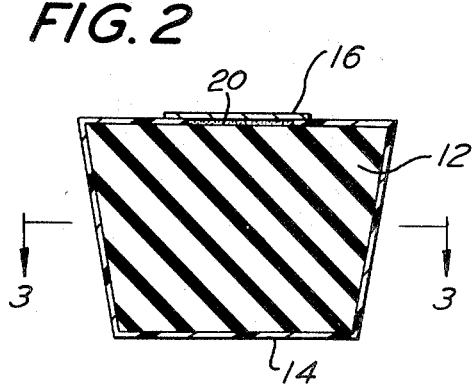
FIG. 2 is a longitudinal sectional view of the stopper illustrated in FIG. 1 taken along the line 2—2.

The core 12 of stopper 10 is preferably made of a resilient material such as natural rubber although synthetic rubbers may be substituted. Since the core is to be protected by an encapsulating coating, the choice of the material for the core is determined primarily by the core's function. In this case, the purpose of the core is to provide body and resiliency. Natural rubber provides these properties.

As indicated above, rubber or its equivalents, when used as the only material for the stopper decomposes under exposure to corrosive chemicals. For example, a rubber stopper exposed to nitric acid ($HNO_3$) vapors shows noticeable decomposition after approximately 1 hour. After 7 days the stopper is rendered almost completely useless. Still more importantly, the acid itself is contaminated.

In accordance with the present invention, the stopper is encapsulated with a coating of a polymerized fluorocarbon resin 14. As shown, coating 14 covers the small end, the sides and a large portion of the top. Since the polymerized fluorocarbon resin does not adhere to the rubber core 12, it must cover a sufficient portion of the larger end of the stopper so as not to slide off. The advantage of leaving a portion of the large or top end of the core 12 exposed is that it provides a means for adhering a label to the top surface by suitable adhesive means 20. The label 16 may be used as a trademark or in the alternative, it may provide a writing surface on which the user of the stopper may identify the reagent within the container.

As indicated previously, the polymerized fluorocarbon resin used to encapsulate the stopper may be selected from the group consisting of polytetrafluoroethylene (PTFE), fluorinated ethylene propylene (FEP), and polyhexafluoropropylene. These products are available on the open market and sold under the trademark Teflon which is a registered trademark of the DuPont Chemical Company and under the trademark Kel-F which is a registered trademark of the 3-M Company. The encapsulating coating 14 may have a range of thickness between 0.002 inches and 0.090 inches. However, the preferred thickness is 0.005 inches within the usual manufacturing tolerances.

Figure 4:
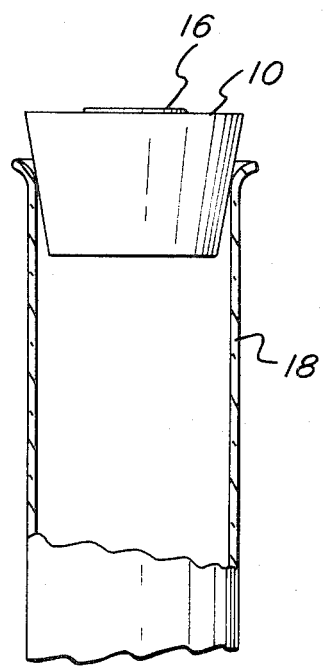
FIG. 4 illustrates the stopper positioned within the mouth of a container for a chemical reagent.
Figure 3:
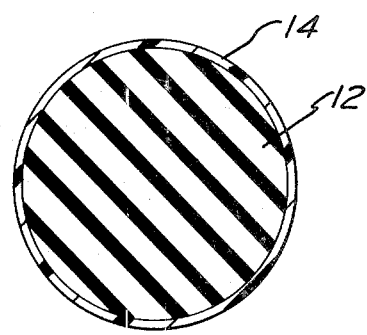
FIG. 3 is a transverse sectional view of the stopper illustrated in FIG. 2 taken along the line 3—3.

As shown in FIG. 4, the stopper 10 has been inserted in a container 18 with the large end at the top. The label 16 is shown in position so that the reagent contained within the container 18 may be readily identified.

When constructed as described above, the stopper 10 has all the resilience of a conventional rubber stopper. In other words, the encapsulating coating is sufficiently thin so as not to affect the physical properties of the stopper. On the other hand, the encapsulating coating is sufficiently thick to provide adequate protection for the stopper. For example, a rubber stopper constructed in accordance with the present invention and coated with a 5-mil. thickness of Teflon was exposed to nitric acid vapors. After 7 days, there was no noticable decomposition.

The present invention may be embodied in other specific forms without departing from the spirit or essential attributes thereof.

I claim:

1. A stopper comprising a frustoconical-shaped core of resilient rubberlike material, said core being covered with a thin coating of a polymerized fluorocarbon resin selected from the group consisting of polytetrafluoroethylene, fluorinated ethylene propylene, and polyhexafluoropropylene, said coating having a thickness between 0.002 inches and 0.090 inches and extending over the small end of said core, the sides of said core and the outer periphery of the top of said core, and said core having a label fixed to the top center thereof.

2. A stopper in accordance with claim 1, wherein said covering is made polytetrafluoroethylene.

3. A stopper in accordance with claim 1, wherein said core is made of rubber.

4. A stopper in accordance with claim 1, wherein said core is made of rubber and said covering is made of polytetrafluoroethylene.

* * * * *